United States Patent [19]
Warner et al.

[11] Patent Number: 5,434,244
[45] Date of Patent: Jul. 18, 1995

[54] PROCESS FOR ISOLATING MACROCYCLIC POLYESTER OLIGOMERS

[75] Inventors: Gregory L. Warner, Schenectady; Paul R. Wilson, Albany; Jean E. Bradt, Esperance, all of N.Y.

[73] Assignee: General Electric Company, Schenectady, N.Y.

[21] Appl. No.: 352,935

[22] Filed: Dec. 9, 1994

[51] Int. Cl.6 ................................. C08F 6/00
[52] U.S. Cl. ..................... 528/490; 528/482; 210/661
[58] Field of Search ............... 528/482, 490; 210/661

[56] References Cited

U.S. PATENT DOCUMENTS 5,039,783  8/1991  Brunelle et al. .................. 528/272

OTHER PUBLICATIONS

Satterfield et al., AIChE Journal, "Liquid Sorption Equilibria of Selected Binary Hydrocarbon Systems in Type Y Zeolites", vol. 18, No. 4, Jul. 1972, pp. 720–728.

Wick et al., Angew. Makromol. Chem. 1983, 112, "Cyclic Oligomers in Polyesters From Diols and Aromatic Dicarboxylic Acids", pp. 59–94.

Meraskentis and Zahn, Chem. Ber. vol. 103, 1970, "Preparation of Cyclic Esters from Terephthalic Acid and Diolen", pp. 3041–3049.

Zahn and Repin, Chem. Ber. vol. 103, 1970, "Synthesis of a Homologous Series of Cyclic Ethylene Terephthalates", pp. 3041–3049.

*Primary Examiner*—Samuel A. Acquah
*Attorney, Agent, or Firm*—Edward A. Squillante, Jr.; William H. Pittman

[57] ABSTRACT

Process for isolating macrocyclic polyester oligomers from impurities comprising the step of subjecting solutions of macrocyclic polyester oligomers to protonated molecular sieves.

9 Claims, No Drawings

PROCESS FOR ISOLATING MACROCYCLIC POLYESTER OLIGOMERS

This invention was made with government support under Government Contract No. 70NANB2H1237 awarded by the National Institute of Standard Technology. The Government has certain rights in this invention.

FIELD OF THE INVENTION

This invention relates to a novel process for isolating macrocyclic polyester oligomers from impurities. More particularly, the invention is directed to a process for isolating said macrocyclic polyester oligomers by subjecting solutions of the macrocyclic polyester oligomers to molecular sieves.

BACKGROUND OF THE INVENTION

Linear polyesters such as poly(alkylene terephthalates) are well known commercially available polymers. They have many valuable characteristics including strength, toughness, high gloss and solvent resistance. Linear polyesters are conventionally prepared by the reaction of a diol with a functional derivative of a dicarboxylic acid, typically a diacid halide or ester. Further, the above-described polyesters may be fabricated into articles by a number of well known techniques including injection and roto molding and extrusion.

In recent years, macrocyclic polyester oligomers have been developed and desired since they have unique properties which make them attractive as matrices for polymer composites. Such desired properties stem from the fact that macrocyclic polyester oligomers exhibit low viscosities, allowing them to impregnate a dense fibrous preform easily. Furthermore, such macrocyclic polyester oligomers melt and polymerize at temperatures well below the melting point of the resulting polymer. Thus, melt flow, polymerization and crystallization can occur isothermally and, therefore, the time and expense required to thermally cycle a tool is favorably reduced.

Methods for producing macrocyclic polyester oligomers typically result in the formation of impurities which often interfere with the polymerization of the macrocyclic polyester oligomers as well as their valuable characteristics. Such impurities are often polar and include alkanediols and monomers, dimers and linear oligomers, all of which are often hydroxy or amine terminated. It is of increasing interest, therefore, to isolate macrocyclic polyester oligomers from such impurities.

The instant invention is directed to a process for isolating macrocyclic polyester oligomers from impurities by contacting solutions of macrocyclic polyester oligomers with molecular sieves.

DESCRIPTION OF THE PRIOR ART

Efforts have been disclosed for recovering cyclic polyesters. In Chem. Ber. Vol. 103, 1970, pp. 3041-3049, a process for purifying cyclic oligomers by chromatography is described and the process comprises the step of contacting said cyclic oligomers with a silica gel column and an organic eluent in order to remove impurities.

Other investigators have focused on the recovery of cyclic polyesters. In Chem. Ber. Vol. 103, 1970, pp. 3034-3040, cyclic compounds are isolated from linear portions by using benzene/dioxane or tetrachloroethane/dioxane eluents.

Finally, Angew. Makromol. Chem. 112, 1983, pp. 59-94 (no. 1771) describes a process for separating cyclic oligomers from linear oligomers by thin-layer chromatography.

The instant invention is patentability distinguishable from the above-described since, among other reasons, it is directed to a novel process for isolating macrocyclic polyester oligomers from impurities by contacting solutions of said macrocyclic polyester oligomers with molecular sieves.

SUMMARY OF THE INVENTION

The instant invention is directed to a novel process for isolating macrocyclic polyester oligomers, said process comprising the step of contacting:
(a) solutions of macrocyclic polyester oligomers; and
(b) protonated molecular sieves.

DETAILED DESCRIPTION OF THE PREFERRED EMBODIMENTS

The macrocyclic polyester oligomer employed in the instant invention are preferably macrocyclic poly(alkylene dicarboxylate) oligomers comprising structural units of the formula

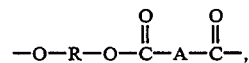

wherein R is an alkylene or mono- or polyoxyalkylene radical containing a straight chain of about 2-8 atoms and A is a m- or p-linked monocyclic aromatic or alicyclic radical. Hence, it is preferred that the macrocyclic polyester oligomers are of the family consisting of polymeric glycol terephthalates or isophthalates and mixtures thereof including copolyesters of terephthalic and isophthalic acids. They are typically characterized by an Mn value of less than about 1500 but preferably about 300 to about 800. Especially preferred macrocyclic polyester oligomers employed in the instant invention are macrocyclic poly(ethylene terephthalate) (PET) and poly (1,4-butylene terephthalate) (PBT) oligomers and copolyesters comprising the same. Said copolyesters typically comprise less than about 25% by weight PET but preferably less than about 15% by weight PET.

The macrocyclic polyester oligomers may be prepared by a method which comprises contacting at least one diol of the formula HO-R-OH and at least one diacid chloride of the formula

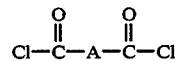

under substantially anhydrous conditions and in the presence of a substantially water immiscible organic solvent, with at least one unhindered tertiary amine; said contact being conducted at a temperature from about −25° to about +25° C.

Other reagents used to synthesize the macrocyclic poly(alkylene dicarboxylate) oligomers employed in the instant invention include unhindered tertiary amines and substantially water-immiscible organic solvents. A detailed description for the preparation of the above-mentioned macrocyclic polyester oligomers may be found in commonly assigned U.S. Pat. No. 5,039,783, the disclosure of which is incorporated herein by reference.

The following example is provided to illustrate the formation of macrocyclic polyester oligomers that may be isolated via this invention.

Example 1

A three-necked round-bottomed flask fitted with a mechanical stirrer, nitrogen purge and septum for reagent addition was charged with 100 ml. of methylene chloride and 5.6 grams (50 mmol.) of 1,4-diazobicyclo[2.2.2]octane amine catalyst. The mixture was cooled to 0° C. and there were separately added in a nitrogen atmosphere over 30 minutes, with stirring, solutions of 20 mmol. of ethylene; glycol in tetrahydrofuran and solutions of 20 mmol. terephthaloyl chloride in 10 ml. of methylene chloride. Stirring was continued for 5 minutes after addition was completed, and then 2 ml. of methanol was added to quench the reaction. Stirring was resumed for 5 minutes, after which 50 ml. of 1 M aqueous hydrochloric acid solution was added, followed by another 5 minutes of stirring. The organic and aqueous layers were separated and the aqueous layer was extracted with an additional 50 ml. of methylene chloride. The combined organic solutions were filtered using a filter aid material when necessary, washed with dilute aqueous hydrochloric acid solution and aqueous sodium chloride solution, and evaporated to dryness.

The products were the desired macrocyclic poly(butylene terephthalate) polyester oligomer compositions. Molecular structures were confirmed by infrared and proton nuclear magnetic resonance spectroscopy and comparison macrocyclic oligomers.

There is no limitation with respect to precursor molecular sieves employed in the instant invention other than that they are capable of being protonated. Capable of being protonated is defined herein, for example, as molecular sieves capable of undergoing an ion exchange with ammonium salts wherein a metal ion is replaced by a hydrogen proton.

The often preferred molecular sieves employed in this invention are those which are referred to as zeolites and they are commercially available. An illustrative list of the zeolites which may be protonated and employed in this invention include mordenites, faujasites, offretites, mazzites, ferrierites and the like.

Additionally, it is noted herein that the zeolites employed in this invention may be either naturally occurring or synthetic. With respect to framework topology, Y type analogs are preferred. The only requirements with respect to the pore sizes of the zeolites are that they are large enough to allow for the polar groups of the impurities to be subjected to the protonated sites. Therefore, it is not necessary that the entire impurity fit into the pore of the molecular sieve since the instant invention is based on the interaction of the polar termination groups of the impurities with the protonated sites of the zeolites. In the instant invention protonated faujasites (H-faujasities) of the Y type are preferred since the Y type analog typically possess a greater pore size which enhances the accessability to the protonated sites resulting in greater isolation.

The instant invention is superior since it unexpectedly allows for at least about 85% and preferably at least about 95% impurity removal when about 100 g of protonated molecular sieve is employed for about every 1 g of impurity removal and preferably about 50 g of protonated molecular sieve is employed for about every 1 g of impurity removal and most preferably about 15 g of protonated molecular sieve for about every 1 g of impurity removal wherein typical isolation systems often require at least about 150 g of silica gel for about every 1 g of impurity removal.

An additional unexpected discovery disclosed in this invention includes the affinity of compounds/linears comprising $sp^2$ hybridization/$\pi$ bonding systems for the protonated zeolites.

In practicing the instant invention, the solutions comprising the macrocyclic polyester oligomers and impurities are poured over the protonated molecular sieves. Agitation may be employed in order to enhance isolation. Furthermore, there is no limitation with respect to the temperature of the solutions in this invention other than that the temperature does not interfere with the protonated sites on the molecular sieves. Moreover, since proton removal from the molecular sieves is often observed at about 450° C., it is preferred that the temperature of the solution is less than about 450° C. and most preferably at about ambient temperature.

Furthermore, it is within the scope of the instant invention to recover any polar compounds from solutions by contacting said solutions with protonated molecular sieves. More particularly, it is within the scope of this invention to recover any hydroxy or amine terminated compounds or oligomers comprising $sp^2$ hybridized/$\pi$ bonding systems by contacting the solutions of the same with the protonated molecular sieves of this invention.

The following examples are provided to further illustrate and facilitate the understanding of this invention. All macrocyclic polyester oligomers and impurities recovered may be confirmed via conventional techniques including proton and carbon—13 nuclear magnetic resonance spectroscopy, infrared spectroscopy and GLC analysis.

Example 2

A solution comprising macrocyclic poly(butylene terephthalate) compositions as prepared in Example 1 was first filtered to remove any precipitated polymer. Subsequently, 1 M HCl was added to the solution to induce precipitation of the amine catalyst. Amine catalyst was recovered via filtration and the resulting flitrate contained 98.3% macrocyclic polyester oligomer, 1.7% polar impurities (linear oligomers as determined by HPLC) at a concentration of about 0.3 M. 10 cc of the filtrate were contacted with 0.05 grams of H-faujasite, Type Y molecular sieve under mild agitation for 18 hours. HPLC analysis further indicated that 98.3% cyclics remained in solution and 51% of all polar impurities were removed via the protonated molecular sieve.

Examples 3–4

Examples 3 and 4 were prepared in a manner similar to the one described in Example 2 except that 0.125 g and 0.25 g, respectively, of protonated molecular sieve were employed. HPLC analysis indicated 80% and 95%, respectively, of polar impurity removal.

Examples 5–7

Examples 5–7 were conducted in a manner similar to the one described in Examples 2–4 except that a solution comprising 91.5% cyclics and 8.5% polar impurities was employed (solution concentration of about 16 M) 0.15 g 0.5 g and 0.75 g of protonated molecular sieve were employed and HPLC analysis revealed 87, 99 and 100% removal, respectively, of polar impurities.

Example 8

Example 8 was prepared in a manner similar to the one described in Example 2 except that the solution contained 92.7% cyclics and 7.3% polar impurities (about 0.23 M) of which 0.2% of the polar impurities were amine endcapped), the contact time was 45 minutes and 0.50 g of protonated molecular sieve were employed. HPLC analysis indicated 100% removal of polar impurities.

What is claimed is:

1. A process for isolating macrocyclic polyester oligomers from impurities comprising the step of contacting:
   (a) solutions of macrocyclic polyester oligomers; and
   (b) protonated molecular sieves.
2. A process for isolating macrocyclic polyester oligomers from impurities in accordance with claim 1 wherein said macrocyclic polyester oligomers are macrocyclic poly(ethylene terephthalates), poly(1,4-butylene terephthalates) or copolyesters thereof.
3. A process for isolating macrocyclic polyester oligomers from impurities in accordance with claim 1 wherein said protonated molecular sieves are zeolites.
4. A process for isolating macrocyclic polyester oligomers from impurities in accordance with claim 3 wherein said zeolites are mordenites, faujasites, offretites, mazzites or ferrierites.
5. A process for isolating macrocylic polyester oligomers from impurities in accordance with claim 4 wherein said zeolites have a Y type topology.
6. A process for isolating macrocyclic polyester oligomers from impurities in accordance with claim 1 wherein said protonated molecular sieve is H-faujasite, type Y.
7. A process for isolating macrocyclic polyester oligomers from impurities in accordance with claim 1 wherein said impurities are alkanediols or hydroxy or amine terminated monomers, dimers, or linear oligomers.
8. A process for isolating macrocyclic polyester oligomers from impurities in accordance with claim 7 wherein said hydroxy or amine terminated monomers, dimers or linear oligomers comprise pi-bonds.
9. A process for isolating macrocyclic polyester oligomers from impurities in accordance with claim 1 wherein about 100 g of said protonated molecular sieve is employed for every 1 g of impurity removal.

* * * * *